3,527,777
METHOD FOR OBTAINING ECDYSTERONES
Josef Jizba, Ujezd nad Lesy, and Frantisek Sorm and Vlastimil Herout, Prague, Czechoslovakia, assignors to Ceskoslovenska Akademie Ved, Prague, Czechoslovakia
No Drawing. Filed Mar. 5, 1968, Ser. No. 710,687
Int. Cl. C07c *167/40*
U.S. Cl. 260—397.25                                              7 Claims

ABSTRACT OF THE DISCLOSURE

Ecdysterone and hydroxyecdysterone are obtained in substantially pure form by extracting plant material derived from Pteridophyta with water or an organic, water-miscible solvent so as to form an extract containing the above-mentioned insect hormones, and separating these hormones from the thus-formed extract.

BACKGROUND OF THE INVENTION

Recently, considerable attention is paid to investigations of regulators of the life processes in the insect organism, i.e., to insect hormones. Thus, the so-called moulting hormone was isolated from the insect organism and its chemical constitution was determined (A. Butenandt, P. Karlson: Z. Naturforsch. 9b, 389 (1954)). This substance which has the structural Formula I and was given the name ecdysone (P. Karlson, H. Hoffmeister, V. Hoppe, R. Ruber: Ann. Chem. 662, 1 (1963)). It is of steroid nature and represents a cholestanol derivative. The substance was isolated by a laborious procedure in trace amounts only. Thus, e.g., only 250 milligrams of the pure ecdysone was obtained from 1000 kilograms of dried pupae of the silkworm (*Bombyx mori*).

From certain Crustaceae, namely from the sea-water crayfish (*Jasus lalandei*), a substance analogous to acdysone was isolated (F. Hampshire, D. H. S. Horn: Chem. Commun. 1966, 37) and named ecdysterone or crustecdysone. It has the structural formula identified herein as II. Ecdysterone is a hydroxy derivative of ecdysone and, later on, was isolated from the insect organism, namely, from pupae of the silkworm; it represents thus also an insect hormone (P. Hocks, R. Wiechert: Tetrahedron Letters 2989 (1966)). Recently, two multistage syntheses of ecdysone were reported but are only of a theoretical interest (J. B. Sidall, A. D. Cross,

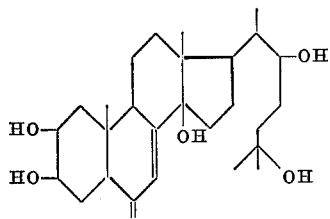

(I) ECDYSONE

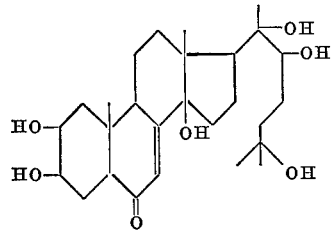

(II) ECDYSTERONE

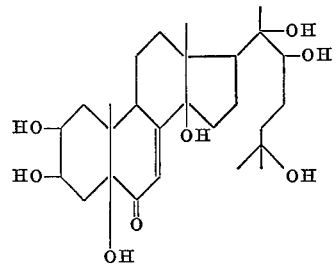

(III) HYDROXYECDYSTERONE

J. H. Fried: J. Am. Chem. Soc. 88, 862 (1966); and U. Kerb, P. Hocks, R. Wiechert, A. Furlenmeier, A. Fuerst, A. Langemann, G. Waldvogel: Tetrahedron Letters 1387 (1966)). Ecdysterone has not been synthesized so far. It has been assumed that ecdysone and ecdysterone are both endogenic factors and represent, as true hormones, products of the metabolism of insects as well as of the crustacea from the organisms of which they were isolated.

It is an object of the present invention to provide in a simple and economical manner substantial quantities of these valuable insect hormones.

DESCRIPTION OF THE PREFERRED EMBODIMENTS

Surprisingly, it has now been found by our investigations that a considerable amount of ecdysterone is contained in certain ferns, especially in rhizomes of the fern *Polypodium vulgare* L. and may be isolated from this material by a relatively simple procedure. These findings are also of theoretical value since they point to the possibility that compounds of the moulting hormone type may also be exogenic factors. Moreover, the ready accessibility of these compounds in accordance with the present invention facilitates more detailed investigation concerning their activity.

These compounds excite accelerated ecdysis connected with growth-disturbances, for inst. with bugs of the family Pyrrhocoridae, where some of the members of genus *Dysdercus* are serious damagers of cotton-trees. The result of such an atypical ecdysis is always fatal. The possibility of gaining these compounds can satisfy the great demand in compounds with ecdysone-like effects for scientific purposes, for studies of life process of insects etc.

Furthermore, an additional substance closely related to ecdysone has been found in rhizomes of *Polypodium vulgare*, namely a hydroxyecdysterone. On the basis of chemical and physico-chemical data, the structure of this substance seems to be that indicated as III herein. The isolated substance also exhibits high activity as an insect moulting hormone. Metabolic transformations of ecdysone-like substances thus occur also in the plant organism.

Up to now it has not been possible to isolate ecdysterone and its derivatives from the plant material, e.g., from *Polypodium vulgare*, in a pure form as may be accomplished in accordance with the method of the present invention.

According to the process of the present invention, ecdysterone and its hydroxy derivatives are obtained as follows:

Preferably, fresh or dried and ground Polypodium rhizomes but also other plant parts derived from Pteridophyta are extracted exhaustively with organic solvents miscible with water, e.g., with methanol or ethanol, or with water alone. The solvent is evaporated under diminished pressure (8 to 25 mm. Hg.). The syrupy residue is diluted with water and washed with non-polar solvents, e.g., with petroleum ether, benzene, or chloroform to remove the lipophilic fraction. The remaining aqueous phase containing about 15–20% of sugars (glucose, fructose, and especially saccharose) is worked up by 8 to 10 extractions with butanol, or by chromatography (it is especially advantageous to subject the aqeous phase to chromatography on a column of polyamide powder), or, by dilution of the aqueous phase free of the lipophilic fraction with ⅓ of ½ (by volume) of methanol and subsequent extraction with chloroform. The chloroform extract may be worked up by chromatography, preferably on polyamide powder. In this case, the crystalline mixture of ecdysterone and its hydroxy derivative was contained in fractions 1 to 3 that means in a few fore-fractions. The contaminating sugars may be removed also by fermentative processes.

The above procedures (except for the chloroform extraction) yield concentrates containing 25–40% of a mixture of the two hormones.

Individual constituents of this crystalline mixture may be separated by subsequent chromatography, preferably on silica gel. The following two substances are obtained: ecdysterone, M.P. 243–247° C. (from acetone), and hydroxyecdysterone, M.P. 244–246° C. (from methanol). These compounds exhibit enormous ecdysone-like activity in insects. The activity was tested on freshly moulted larvae of the bug *Pyrrhocoris apterus* and the fly *Calliphora erythrocephala*. Microcrystals of the substance (about 50 gamma) implanted into the haemolymph of *Pyrrhocoris apterus* cause a precocious moulting after two and a half days while the normal moulting does not occur before the seventh day.

The following examples are given as illustrative only without limiting the invention to the specific details of the examples.

EXAMPLE I

Preparation of a crude mixture containing ecdysone-like substances

Dried and ground rhizomes of *Polypodium vulgare* (1000 g.) are exhaustively extracted with ethanol. The solvent is evaporated under diminished pressure and the residual syrup (92 g.) is diluted with 400 ml. of water. The resulting mixture is washed exhaustively with petroleum ether and the washings are discarded. The aqueous solution may be then worked up as follows:

(a) The aqueous solution is applied to a column of polyamide powder (1000 g.) The elution is performed with water, 500 ml. fractions being taken. The first fraction contains predominantly saccharose. The second fraction is concentrated to deposit a crystalline mixture (M.P. about 235° C.) of ecdysterone and hydroxyecdysterone.

(b) More preferably, the above aqueous solution is diluted, e.g., with an equal volume of methanol, and then extracted with five to eight portions of an equal volume of 1-butanol. The butanolic extract is dried, evaporated, and the residue chromatographed on a polyamide column in analogy to the procedure under (a).

(c) Instead of 1-butanol (b), chloroform (10 liters) is used in the extraction. The chloroform extract is evaporated and the residual mixture is chromatographed on a polyamide column. The crystalline mixture of both hormones is contained in fractions 1–4 that means in a few fore-fractions.

(d) The sugars may be removed also by fermentations. Thus, the mother liquors remaining after the crystalline mixture of the ecdysone-like substances obtained by chromatography, or other sugar-containing extracts are diluted with water to obtain a 15–20% solution. The solution is treated with 1 g. of ammonium sulfate and subjected to fermentation at about 36° C. The solution is filtered, concentrated, and the concentrate processed, e.g., according to (a), or chromatographed on silica gel as described below.

EXAMPLE II

Preparation of pure ecdysterone and hydroxyecdysterone

A crystalline mixture (5.5 g.) of ecdysterone and hydroxyecdysterone is dissolved in acetone and the solution is chromatographed on a column of silica gel (250 g., water content 15%), 20 ml. fractions being taken. The content and purity of the eluate is checked by thin-layer chromatography on silica gel. The column is eluted with acetone or a 9:1 mixture of chloroform-methanol. Thus, in a typical experiment, the first 400 ml. of the acetone eluate contained pure ecdysterone which after crystallization from water melted at 151° C., yield 2.0 g. The middle fractions contained a mixture of both compounds. The final fractions (total 650 ml.) contained pure hydroxyecdysterone which after crystallization from methanol melted at 244–246° C., yield 0.37 g.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of obtaining ecdysterones selected from the group consisting of ecdysterone and hydroxyecdysterone comprising the steps of extracting vegetable material derived from a plant belonging to the class Polypodiacea with water or a mixture of an oragnic solvent that is miscible with water and water so as to dissolve said ecdysterones and to form an extract consisting essentially of a mixture of said two ecdysterones dissolved in said solvent; concentrating the extract to obtain a syrupy residue; removing lipophilic constituents from said residue and then extracting a crystalline mixture of said two ecdysterones from the syrup.

2. The method of claim 1 wherein said extraction of the crystalline mixture from the syrupy residue is effected by chromatography through a polyamide powder column.

3. The method of claim 1 wherein said extraction of the crystalline mixture from said syrupy extract is effected by means of butanol or chloroform.

4. The method of claim 1 wherein said syrupy residue is first diluted with water and washed with a nonpolar solvent so as to remove the lipophilic constituents from the residue whereupon said crystalline mixture is extracted from the aqueous phase remaining after removal of the non-polar solvent phase.

5. The method of claim 1 wherein the two ecdysterones are subsequently separated by subjecting said crystalline mixture to chromatography.

6. The method of claim 5 wherein the chromatography for separation purposes is effected through a silica gel column.

7. A method as defined in claim 1, wherein said plant is *Polypodium vulgare*.

References Cited

UNITED STATES PATENTS 3,433,814 3/1969 Takemato et al. __ 260—397.25

HENRY A. FRENCH, Primary Examiner

U.S. Cl. X.R.

260—999